United States Patent
Koretz

(10) Patent No.: US 8,260,924 B2
(45) Date of Patent: Sep. 4, 2012

(54) USER LOAD BALANCING SYSTEMS AND METHODS THEREOF

(75) Inventor: David A. Koretz, Rochester, NY (US)

(73) Assignee: BlueTie, Inc., Rochester, NY (US)

( * ) Notice: Subject to any disclaimer, the term of this patent is extended or adjusted under 35 U.S.C. 154(b) by 569 days.

(21) Appl. No.: 11/416,528

(22) Filed: May 3, 2006

(65) Prior Publication Data
US 2007/0260732 A1   Nov. 8, 2007

(51) Int. Cl.
*G06F 15/173*   (2006.01)
(52) U.S. Cl. ........................ 709/226; 709/206
(58) Field of Classification Search .......... 709/223–226, 709/200–204; 718/103–105; 702/179–188; 710/6–7, 15, 19, 29, 36–45, 58–61; 707/821–827
See application file for complete search history.

(56) References Cited

U.S. PATENT DOCUMENTS

| | | |
|---|---|---|
| 5,101,425 A | 3/1992 | Darland et al. |
| 5,210,789 A | 5/1993 | Jeffus et al. |
| 5,442,707 A | 8/1995 | Miyaji et al. |
| 5,493,105 A | 2/1996 | Desai |
| 5,509,074 A | 4/1996 | Choudhury et al. |
| 5,551,030 A | 8/1996 | Linden et al. |
| 5,615,268 A | 3/1997 | Bisbee et al. |
| 5,617,114 A | 4/1997 | Bier et al. |
| 5,640,577 A | 6/1997 | Scharmer |
| 5,654,908 A | 8/1997 | Yokoyama |
| 5,694,563 A | 12/1997 | Belfiore et al. |
| 5,706,517 A | 1/1998 | Dickinson |
| 5,727,057 A | 3/1998 | Emery et al. |
| 5,737,424 A | 4/1998 | Elteto et al. |
| 5,737,726 A | 4/1998 | Cameron et al. |
| 5,774,117 A | 6/1998 | Kukkal et al. |
| 5,774,668 A | 6/1998 | Choquier et al. |
| 5,790,790 A | 8/1998 | Smith et al. |
| 5,790,793 A | 8/1998 | Higley |
| 5,794,207 A | 8/1998 | Walker et al. |
| 5,794,259 A | 8/1998 | Kikinis |
| 5,802,518 A | 9/1998 | Karaev et al. |
| 5,805,811 A | 9/1998 | Pratt et al. |
| 5,818,442 A | 10/1998 | Adamson |
| 5,835,896 A | 11/1998 | Fisher et al. |
| 5,845,261 A | 12/1998 | McAbian |

(Continued)

FOREIGN PATENT DOCUMENTS

WO   WO 00/23862 A3   4/2000

OTHER PUBLICATIONS

Miller, Michael "The Complete Idiot's Guide to Online Auctions," (1999).

(Continued)

*Primary Examiner* — Greg C Bengzon
(74) *Attorney, Agent, or Firm* — LeClairRyan, a Professional Corporation

(57) ABSTRACT

A method, computer readable medium and system for user load balancing includes identifying when an overall load in at least one of two or more servers exceeds one or more thresholds that are related to one or more user loads. One or more of the user loads in the identified overall load in one of the servers are transferred to one or more of the other servers when the one or more thresholds is exceeded.

33 Claims, 2 Drawing Sheets

U.S. PATENT DOCUMENTS

| | | | |
|---|---|---|---|
| 5,848,131 A | 12/1998 | Moore et al. | |
| 5,848,161 A | 12/1998 | Luneau et al. | |
| 5,852,807 A | 12/1998 | Skarbo et al. | |
| 5,855,006 A | 12/1998 | Huemoeller et al. | |
| 5,870,470 A | 2/1999 | Johnson et al. | |
| 5,870,544 A | 2/1999 | Curtis | |
| 5,875,296 A | 2/1999 | Shi et al. | |
| 5,878,141 A | 3/1999 | Daly et al. | |
| 5,889,989 A * | 3/1999 | Robertazzi et al. | 718/105 |
| 5,890,138 A | 3/1999 | Godin et al. | |
| 5,893,118 A | 4/1999 | Sonderegger | |
| 5,895,454 A | 4/1999 | Harrington | |
| 5,897,622 A | 4/1999 | Blinn et al. | |
| 5,899,980 A | 5/1999 | Wilf et al. | |
| 5,905,973 A | 5/1999 | Yonezawa et al. | |
| 5,917,491 A | 6/1999 | Bauersfeld | |
| 5,940,807 A | 8/1999 | Purcell | |
| 5,946,665 A | 8/1999 | Suzuki et al. | |
| 5,948,040 A | 9/1999 | DeLorme et al. | |
| 5,950,200 A | 9/1999 | Sudai et al. | |
| 5,956,709 A | 9/1999 | Xue | |
| 5,960,406 A | 9/1999 | Rasansky et al. | |
| 5,960,411 A | 9/1999 | Hartman et al. | |
| 5,963,949 A | 10/1999 | Gupta et al. | |
| 5,970,475 A | 10/1999 | Barnes et al. | |
| 5,974,441 A | 10/1999 | Rogers et al. | |
| 5,987,423 A | 11/1999 | Arnold et al. | |
| 5,991,740 A | 11/1999 | Messer | |
| 5,995,098 A | 11/1999 | Okada et al. | |
| 5,999,914 A | 12/1999 | Blinn et al. | |
| 5,999,938 A | 12/1999 | Bliss et al. | |
| 6,006,215 A | 12/1999 | Retallick | |
| 6,006,332 A | 12/1999 | Rabne et al. | |
| 6,014,647 A | 1/2000 | Nizzari et al. | |
| 6,016,478 A | 1/2000 | Zhang et al. | |
| 6,058,417 A | 5/2000 | Hess et al. | |
| 6,065,046 A | 5/2000 | Feinberg et al. | |
| 6,085,166 A | 7/2000 | Beckhardt et al. | |
| 6,086,618 A | 7/2000 | Al-Hilali et al. | |
| 6,111,572 A | 8/2000 | Blair et al. | |
| 6,141,005 A | 10/2000 | Hetherington et al. | |
| 6,148,335 A | 11/2000 | Haggard et al. | |
| 6,182,109 B1 * | 1/2001 | Sharma et al. | 718/104 |
| 6,219,669 B1 | 4/2001 | Haff et al. | |
| 6,259,405 B1 | 7/2001 | Stewart et al. | |
| 6,262,725 B1 | 7/2001 | Hetherington et al. | |
| 6,266,651 B1 | 7/2001 | Woolston | |
| 6,269,135 B1 | 7/2001 | Sander | |
| 6,269,369 B1 | 7/2001 | Robertson | |
| 6,363,392 B1 | 3/2002 | Halstead et al. | |
| 6,369,840 B1 | 4/2002 | Barnett et al. | |
| 6,370,566 B2 | 4/2002 | Discolo et al. | |
| 6,393,421 B1 | 5/2002 | Paglin | |
| 6,430,611 B1 | 8/2002 | Kita et al. | |
| 6,446,123 B1 | 9/2002 | Ballantine et al. | |
| 6,581,088 B1 * | 6/2003 | Jacobs et al. | 718/105 |
| 6,598,027 B1 | 7/2003 | Breen et al. | |
| 6,601,092 B2 | 7/2003 | Itabashi et al. | |
| 6,633,898 B1 * | 10/2003 | Seguchi et al. | 709/201 |
| 6,647,370 B1 | 11/2003 | Fu et al. | |
| 6,658,473 B1 | 12/2003 | Block et al. | |
| 6,732,171 B2 * | 5/2004 | Hayden | 709/223 |
| 6,763,335 B1 | 7/2004 | Nanbu et al. | |
| 6,831,970 B1 | 12/2004 | Awada et al. | |
| 6,862,623 B1 | 3/2005 | Odhner et al. | |
| 6,879,691 B1 | 4/2005 | Koretz | |
| 6,898,564 B1 | 5/2005 | Odhner et al. | |
| 6,898,633 B1 * | 5/2005 | Lyndersay et al. | 709/226 |
| 6,917,963 B1 * | 7/2005 | Hipp et al. | 709/204 |
| 6,938,256 B2 | 8/2005 | Deng et al. | |
| 6,950,662 B2 | 9/2005 | Kumar | |
| 6,954,784 B2 * | 10/2005 | Aiken et al. | 709/220 |
| 6,957,433 B2 * | 10/2005 | Umberger et al. | 718/103 |
| 6,986,076 B1 | 1/2006 | Smith et al. | |
| 6,990,662 B2 * | 1/2006 | Messer et al. | 717/174 |
| 6,993,572 B2 | 1/2006 | Ross, Jr. et al. | |
| 7,050,936 B2 * | 5/2006 | Levy et al. | 702/181 |
| 7,110,913 B2 | 9/2006 | Monroe et al. | |
| 7,113,990 B2 * | 9/2006 | Scifres et al. | 709/224 |
| 7,124,101 B1 | 10/2006 | Mikurak | |
| 7,219,109 B1 | 5/2007 | Lapuyade et al. | |
| 7,305,471 B2 | 12/2007 | Odhner et al. | |
| 7,305,491 B2 | 12/2007 | Miller et al. | |
| 7,313,620 B2 | 12/2007 | Odhner et al. | |
| 7,392,314 B2 * | 6/2008 | Betzler et al. | 709/226 |
| 7,437,449 B1 | 10/2008 | Monga et al. | |
| 7,443,767 B2 | 10/2008 | Mohler et al. | |
| 7,475,206 B2 * | 1/2009 | Murotani et al. | 711/162 |
| 7,499,715 B2 | 3/2009 | Carro et al. | |
| 7,552,208 B2 | 6/2009 | Lubrecht et al. | |
| 7,562,140 B2 | 7/2009 | Clemm et al. | |
| 7,562,145 B2 * | 7/2009 | Aiken et al. | 709/227 |
| 7,617,303 B2 | 11/2009 | Duggirala | |
| 7,657,638 B2 * | 2/2010 | Deen et al. | 709/229 |
| 7,689,448 B2 | 3/2010 | Fu et al. | |
| 7,693,983 B1 * | 4/2010 | Gupta et al. | 709/224 |
| 7,711,855 B2 | 5/2010 | Thind et al. | |
| 7,725,559 B2 | 5/2010 | Landis et al. | |
| 2001/0049613 A1 | 12/2001 | Gramann, III et al. | |
| 2002/0099576 A1 | 7/2002 | MacDonald et al. | |
| 2002/0147759 A1 * | 10/2002 | Ranganathan | 709/104 |
| 2002/0152305 A1 | 10/2002 | Jackson et al. | |
| 2002/0178206 A1 * | 11/2002 | Smith | 709/102 |
| 2003/0069874 A1 | 4/2003 | Hertzog et al. | |
| 2003/0115244 A1 | 6/2003 | Molloy et al. | |
| 2003/0135507 A1 | 7/2003 | Hind et al. | |
| 2004/0010451 A1 | 1/2004 | Romano et al. | |
| 2004/0015539 A1 * | 1/2004 | Alegria et al. | 709/203 |
| 2004/0024894 A1 * | 2/2004 | Osman et al. | 709/230 |
| 2004/0039626 A1 | 2/2004 | Voorhees | |
| 2004/0054504 A1 * | 3/2004 | Chang et al. | 702/186 |
| 2004/0064543 A1 * | 4/2004 | Ashutosh et al. | 709/224 |
| 2004/0103189 A1 | 5/2004 | Cherkasova et al. | |
| 2004/0117476 A1 | 6/2004 | Steele et al. | |
| 2004/0162901 A1 * | 8/2004 | Mangipudi et al. | 709/225 |
| 2005/0005012 A1 | 1/2005 | Odhner et al. | |
| 2005/0050138 A1 * | 3/2005 | Creamer et al. | 709/200 |
| 2005/0097204 A1 | 5/2005 | Horowitz et al. | |
| 2005/0114191 A1 | 5/2005 | Atkin et al. | |
| 2005/0138170 A1 | 6/2005 | Cherkasova et al. | |
| 2005/0149417 A1 | 7/2005 | Crescenzo et al. | |
| 2005/0198179 A1 * | 9/2005 | Savilampi | 709/206 |
| 2005/0228879 A1 | 10/2005 | Cherkasova et al. | |
| 2005/0240466 A1 | 10/2005 | Duggirala | |
| 2005/0278439 A1 | 12/2005 | Cherkasova | |
| 2005/0278453 A1 | 12/2005 | Cherkasova | |
| 2006/0020691 A1 * | 1/2006 | Patterson et al. | 709/223 |
| 2006/0068812 A1 | 3/2006 | Carro et al. | |
| 2006/0218278 A1 | 9/2006 | Uyama et al. | |
| 2007/0061441 A1 | 3/2007 | Landis et al. | |
| 2007/0067435 A1 | 3/2007 | Landis et al. | |
| 2007/0067440 A1 * | 3/2007 | Bhogal et al. | 709/224 |
| 2007/0113186 A1 | 5/2007 | Coles et al. | |
| 2007/0130364 A1 * | 6/2007 | Joglekar et al. | 709/238 |
| 2007/0168498 A1 | 7/2007 | Lambert et al. | |
| 2007/0208803 A1 * | 9/2007 | Levi et al. | 709/203 |
| 2007/0214188 A1 | 9/2007 | Lapuyade et al. | |
| 2007/0233556 A1 | 10/2007 | Koningstein | |
| 2007/0245010 A1 * | 10/2007 | Arn et al. | 709/223 |
| 2007/0294387 A1 * | 12/2007 | Martin | 709/224 |
| 2008/0004748 A1 | 1/2008 | Butler et al. | |
| 2008/0091726 A1 | 4/2008 | Koretz et al. | |
| 2008/0201720 A1 * | 8/2008 | Betzler et al. | 718/105 |
| 2009/0276771 A1 * | 11/2009 | Nickolov et al. | 717/177 |

OTHER PUBLICATIONS

BuyTextiles.com (http://www.ecompartners.com/buytextiles/htm/listing_help.htm), 1-4 (1999).

David Koretz.com (http://dkoretz.typepad.com/rants/2006/06/featuretisement.html), 1-3 (2006).

"Business Requirements User Load Balancer (ULB)," Blue Tie, Inc., 2006, pp. 1-15.

* cited by examiner

USER LOAD BALANCING SYSTEMS AND METHODS THEREOF

FIELD OF THE INVENTION

This invention generally relates to data storage management systems and methods thereof and, more particularly, to automatic, user load balancing systems and methods thereof.

BACKGROUND

In the emerging Software as a Service ("SaaS") market, the majority of the processing occurs at the server and the data is centralized to take advantage of the anywhere, anytime connectivity that the Internet provides. The power of the connectivity to and sharing of information is leading to massively scalable applications that support hundreds of thousands, up to hundreds of millions of users.

Massively scalable applications are creating many new challenges in managing the users and data in an automated fashion. The ability to manage user load is particularly critical in data-heavy applications, such as email, file storage, and online backup. A user load is a load on a given server or servers using one or more services and an overall load includes the utilization of processor, memory, I/O reads, writes and transactions per second, network, disk space, power, and application or applications. To manage overall loads, currently administrators are forced to manually move these data heavy user loads between servers which is time consuming and inefficient. Additionally, these manual moves of user loads can lead to interruption in service to users.

Load balancers have been developed, but they reside at the edge of the network in front of application servers and are only available to take and split incoming traffic data between servers based on low level metrics. These low level metrics consist of factors, such as the number of network connections on a server or how fast a server is responding to HTRP requests, and are unrelated to either user loads or overall loads on the servers. These prior load balancers work well for web servers where all of the data on each server is identical or "stateless," but do not work in applications where each user has unique data, such as in the emerging SaaS market or Web 2.0, where the data on each server is unique to each user or "stateful" and thus is dynamically changing for each user. Additionally, these load balancers do not work well were each of the user loads utilize different applications.

SUMMARY

A method for user load balancing in accordance with embodiments of the present invention includes identifying when an overall load in at least one of two or more servers exceeds one or more thresholds that are related to one or more user loads. One or more of the user loads in the identified overall load in one of the servers are transferred to one or more of the other servers when the one or more thresholds is exceeded.

A computer readable medium having stored thereon instructions for user load balancing in accordance with embodiments of the present invention identifying when an overall load in at least one of two or more servers exceeds one or more thresholds that are related to one or more user loads. One or more of the user loads in the identified overall load in one of the servers are transferred to one or more of the other servers when the one or more thresholds is exceeded.

A user load balancing system in accordance with embodiments of the present invention includes a threshold system and a transfer system. The threshold system identifies when an overall load in at least one of two or more servers exceeds one or more thresholds. Each of the overall loads comprises one or more user loads and each of the one or more thresholds is based on the user loads. The transfer system initiates a transfer of one or more of the user loads in the identified overall load in one of the servers to one or more of the other servers when the one or more thresholds is exceeded.

The present invention provides a number of advantages including providing an effective and automatic method and system for balancing user loads, such as stateful data comprising user emails, between two or more servers, such as storage servers, partitions of a centralized storage, or application servers. Additionally, with the present invention the balancing of the user loads between storage servers and/or application servers is seamless to the end user and occurs without an interruption in service. Further, the present invention is able to ensure the balancing of the user loads without loss of any of the user loads. Even further, the present invention is able to distinguish between temporary heavy usage which would not require intervention, and might even hinder performance, and more persistent heavy usage requiring user load balancing.

DETAILED DESCRIPTION

Figure 1:
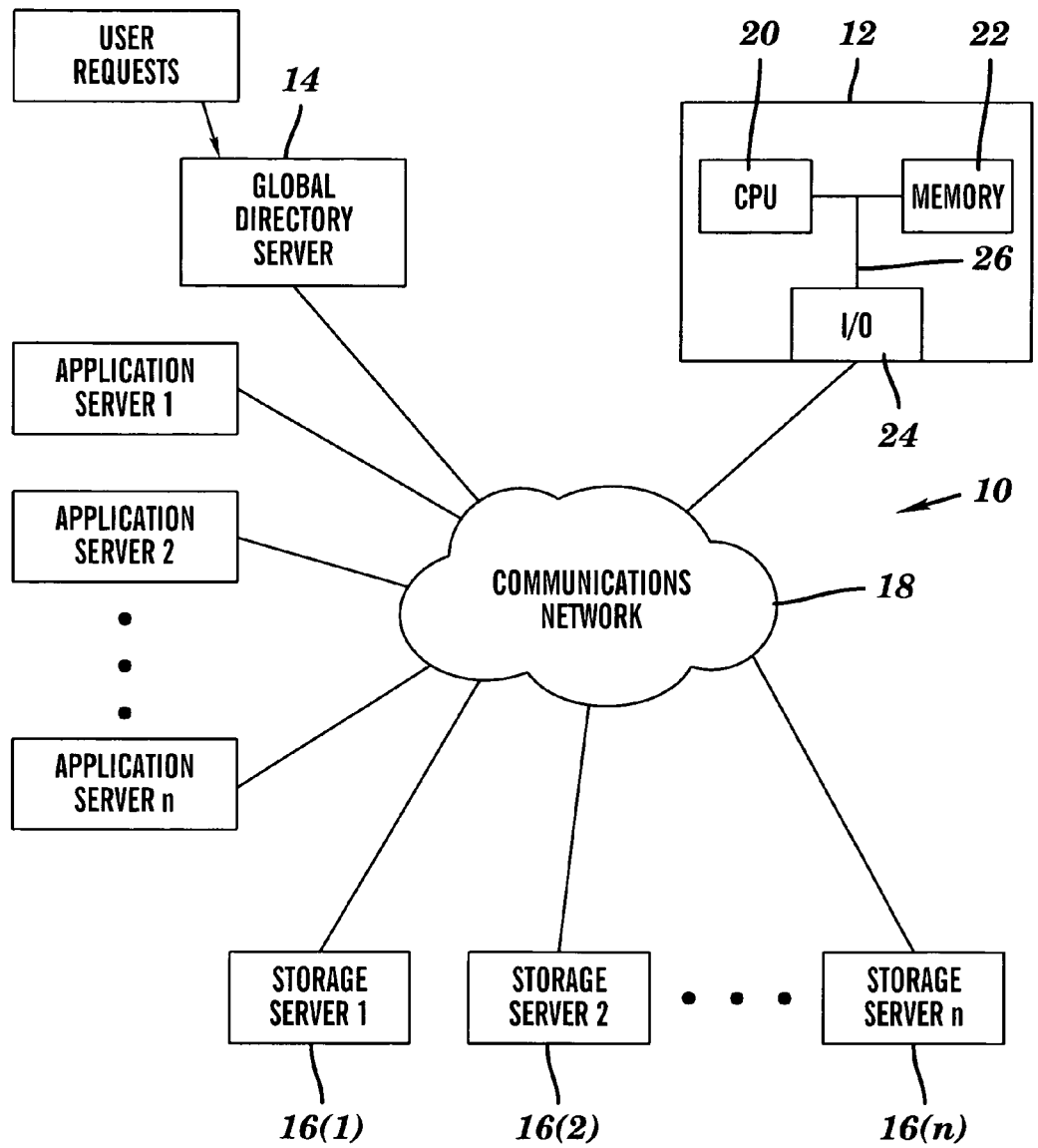
FIG. 1 is a block diagram of a user load balancing system in accordance with embodiments of the present invention.

A system 10 with a user load balancing system 12 in accordance other embodiments of the present invention is illustrated in FIG. 1. The system 10 includes a user load balancing system 12, a global directory server 14, storage servers 16(1)-16(n), application servers 17(1)-17(n), and a communications network 18, although the system 10 can comprise other numbers and types of components in other configurations. The present invention provides an effective and automatic method and system for balancing user loads, such as stateful data comprising user emails, between two or more two or more servers, such as storage servers, partitions of a centralized storage, or application servers.

Referring more specifically to FIG. 1, the user load balancing system 12 monitors and determines when the overall load for one or more of the storage servers 16(1)-16(n) and one or more application servers 17(1)-17(n) exceeds one or more of the thresholds that would require one or more user loads comprising stateful data to be moved to a different one of the storage servers 16(1)-16(n) and/or one or more application servers 17(1)-17(n). The user load balancing system 12 includes system monitoring tools and protocols, such as Simple Network Management Protocol ("SNMP"), although other types and manners for monitoring the loads in the storage servers 16(1)-16(n) can be used.

The user load balancing system 12 comprises a central processing unit (CPU) or processor 20, a memory 22, and an interface system 24 which are coupled together by a bus or other link 26, although the user load balancing system can comprise other numbers and types of each of the components and other configurations and locations for each of the components can be used. The processor 20 executes a program of stored instructions for one or more aspects of the present invention as described and illustrated herein, including the method for user load balancing, although the processor 20 could execute other types of programmed instructions. The memory 22 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one of the processor, can be used for the memory 22.

The interface system 24 is used to operatively couple and communicate between the user load balancing system 12 and the global directory server 14, the storage servers 16(1)-16(n), and the application servers 17(1)-17(n) via communications system 18 although other types and numbers of connections and other configurations could be used. In this particular embodiment, the communication system 18 is via TCP/IP over an Ethernet and uses industry-standard protocols including SOAP, XML, LDAP, and SNMP, although other types and numbers of communication systems, such as a direct connection, another local area network, a wide area network, Internet, modems and phone lines, e-mails, and/or wireless communication technology each having their own communications protocols, could be used.

The global directory server 14 includes a centralized master directory of locations where servers, services, and user data reside, although the global directory server can store other types of information. Any user via a service or application can query the global directory server 14 to find out where given data in a user load is located.

The global directory server 14 also includes a central processing unit (CPU) or processor, a memory, and an interface system which are coupled together by a bus or other link, although other numbers and types of each of the components and other configurations and locations for the components can be used. For example, the global directory server 14 can comprise a single server as shown or can be replicated in a series of masters and slaves. In a master/slave environment, the master global directory server will be in charge of all updates and the slave global directory servers will be read servers that respond to application requests. This enables the directory in the global directory server 14 to scale.

In this particular embodiment, the processor in the global directory server 14 shown in FIG. 1 executes a program of stored instructions for one or more aspects of the present invention as described herein, including instructions for storing locations for each of the user loads on the storage servers 16(1)-16(n) and on the application servers 17(1)-17(n) and for the services requested by users. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the management server system. The interface system in the global directory server 14 is used to operatively couple and communicate between the global directory server 14 and the user load balancing system 12, the storage servers 16(1)-16(n), and the application servers 17(1)-17(n), although other types of connections could be used.

Each of the storage servers 16(1)-16(n) is used to store user loads comprising stateful and stateless data, although one or more of the storage servers 16(1)-16(n) could have other functions. This storage could be local or could be over SAN, NAS, iSCSI, distributed file systems, or other types of local or remote network systems. Each of the user loads stored in the storage servers 16(1)-16(n) comprises stateful data and stateless data, although other types and combinations of data can be stored, such as just user loads with just stateful data. In this particular embodiment, each of the storage servers 16(1)-16(n) includes a central processing unit (CPU) or processor, a memory, and an interface system which are coupled together by a bus or other link, although other numbers and types of each of the components and other configurations and locations for the components can be used. Additionally, one or more other types of servers can be used with or in place of storage servers 16(1)-16(n), such as network area storage or one or more application servers.

The processor in each of the storage servers 16(1)-16(n) executes a program of stored instructions for one or more aspects of the present invention as described herein, including instructions for storing stateful and stateless data and for transferring data between storage servers 16(1)-16(n) and/or application servers 17(1)-17(n). The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the management server system. The interface system in each of the storage servers 16(1)-16(n) is used to operatively couple and communicate between the storage servers 16(1)-16(n) and the user load balancing system 12, the global directory server 14, and the application servers 17(1)-17(n), although other types and connections could be used.

Each of the application servers 17(1)-17(n) has one or more user loads relating to the execution of one or more applications, such as email or one or more other applications, although one or more of the application servers 17(1)-17(n) could have other functions and other types and numbers of systems could be used. Each of the application servers 17(1)-17(n) also includes a central processing unit (CPU) or processor, a memory, and an interface system which are coupled together by a bus or other link, although other numbers and types of each of the components and other configurations and locations for the components can be used.

The processor in each of the application servers 17(1)-17(n) executes a program of stored instructions for one or more aspects of the present invention as described herein, including instructions for applications, such as email and/or one or more other applications, and for transferring data between application servers 17(1)-17(n) and/or storage servers 16(1)-16(n). The memory stores these programmed instructions for one or more aspects of the present invention as described herein, although some or all of the programmed instructions could be stored and/or executed elsewhere, such as in one or memories of provider systems. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the management server system. The interface system in each of the storage servers 17(1)-17(n) is used to operatively couple and communicate between the storage servers 17(1)-17(n) and the predictive capacity planning system 12, the global directory server system 14, and storage servers 16(1)-16(n), although other types and connections could be used.

Although an example of embodiments of the user load balancing system 12, the global directory server 14, the storage servers 16(1)-16(n), application servers 17(1)-17(n) is described and illustrated herein, each of the user load balancing system 12, the global directory server 14, the storage servers 16(1)-16(n), and application servers 17(1)-17(n) of the present invention could be implemented on any suitable computer system or computing device. It is to be understood that the devices and systems of the exemplary embodiments are for exemplary purposes, as many variations of the specific hardware and software used to implement the exemplary embodiments are possible, as will be appreciated by those skilled in the relevant art(s).

Furthermore, each of the systems of the present invention may be conveniently implemented using one or more general purpose computer systems, microprocessors, digital signal processors, micro-controllers, and the like, programmed according to the teachings of the present invention as described and illustrated herein, as will be appreciated by those skilled in the computer and software arts.

In addition, two or more computing systems or devices can be substituted for any one of the systems in any embodiment of the present invention. Accordingly, principles and advantages of distributed processing, such as redundancy, replication, and the like, also can be implemented, as desired, to increase the robustness and performance the devices and systems of the exemplary embodiments. The present invention may also be implemented on computer systems that extend across any network using any suitable interface mechanisms and communications technologies including, for example telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination thereof, and the like.

The present invention may also be embodied as a computer readable medium having instructions stored thereon for user load balancing as described herein, which when executed by a processor, cause the processor to carry out the steps necessary to implement the methods of the present invention as described and illustrated herein.

Figure 2:
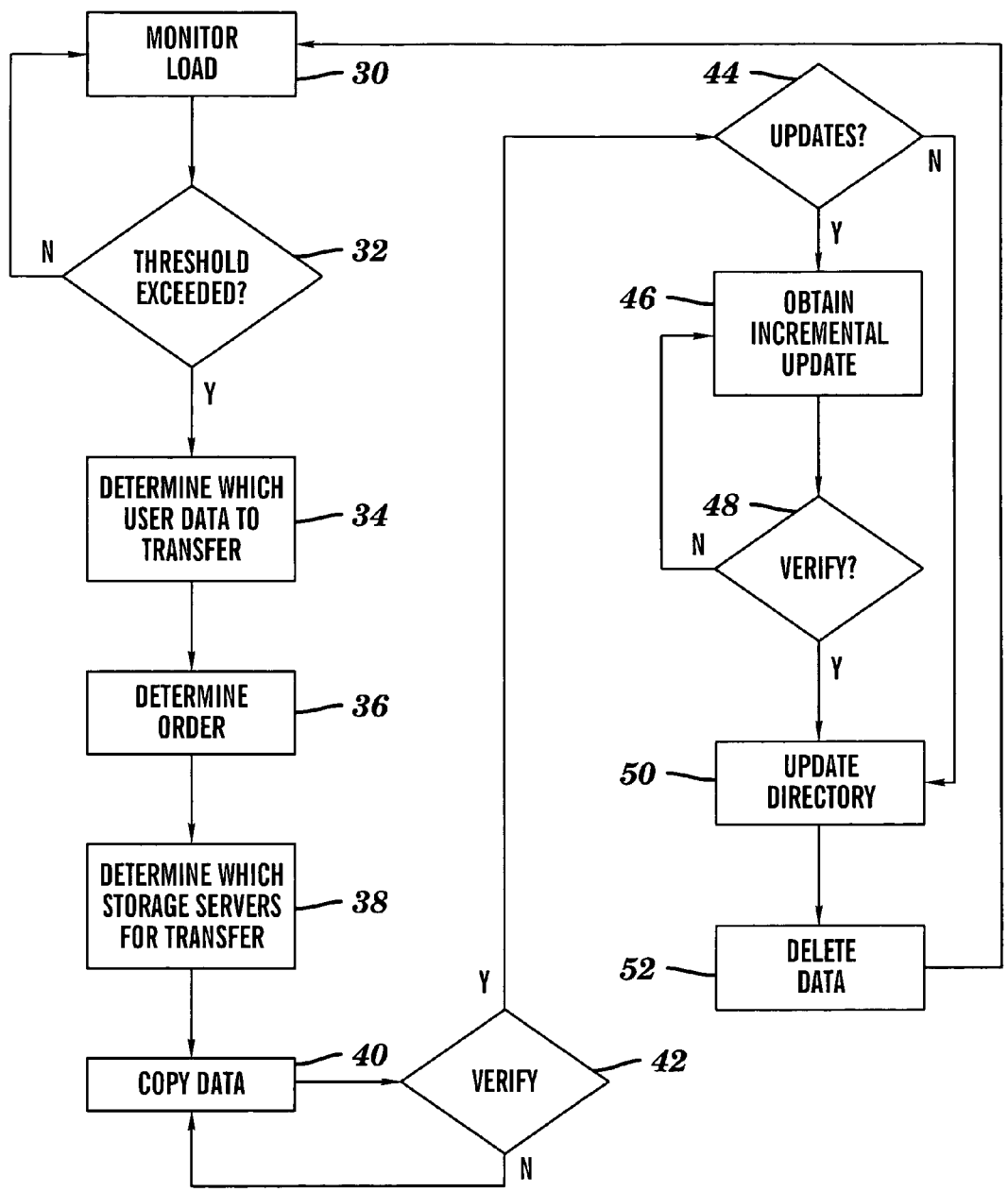
FIG. 2 is a flow chart of a method for user load balancing in accordance with embodiments of the present invention.

The operation of the user load balancing system 12 in a system 10 will now be described with reference to FIGS. 1 and 2. In step 30, the user load balancing system 12 monitors the user loads in the overall loads in each of the storage servers 16(1)-16(n) and each of the application servers 17(1)-17(n) to determine if any thresholds have been exceeded, although the user load balancing system 12 could monitor other numbers and types of systems in other configurations, such as just storage servers 16(1)-16(n). Since the user loads in the overall loads in each of the storage servers 16(1)-16(n) include stateful data, the user loads and thus the overall loads can change at varying rates which can impact the operation of the storage servers 16(1)-16(n). For example, one or more of the storage servers 16(1)-16(n) might be reaching capacity or there could be a wide disparity between the size of the user loads on each of the storage servers 16(1)-16(n). Similarly, the user loads on one or more of the application servers 17(1)-17(n) may also be changing at varying rates based on user requests. As a result, one or more of the application servers 17(1)-17(n) might be reaching capacity or there could be a wide disparity between the size of the user loads on each of the application servers 17(1)-17(n).

By way of example only, the types thresholds being monitored by the user load balancing system include: disk space utilization (measured in both total Gigabytes (GB) of usable storage as well as measured in a percentage of 100%); RAM utilization (measured in percentages of 100%); I/O load (measured by the number of I/O reads per second, the number of I/O writes per second and the number of transactions per second; and network load (measured as a percentage of 100%), although other types and numbers of thresholds related to user loads and/or overall loads can be monitored. Additionally, the user load balancing system 12 can be configured to allow an administrator to enter and/or adjust one or more of the particular thresholds as needed or desired for the particular application.

More specifically, in these embodiments the user load balancing system 12 monitors for short and long term threshold trends in the overall loads on the storage servers 16(1)-16(n) and application servers 17(1)-17(n). These short and long term threshold trends or thresholds are entered by an administrator in the user load balancing system, although other configurations can be used, such as having the short and long term thresholds stored and retrieved from memory in the user load balancing system 12.

By way of example only, short term thresholds monitored by the user load balancing system 12 include: processor utilization at greater than 90% for longer than five minutes; RAM utilization at greater than 90% for longer than 20 minutes; network load higher than 90% for longer than five minutes; and I/O read/writes at greater than 90% of capacity for longer than 30 minutes, although these are exemplary and again other types and numbers of short term threshold trends can be monitored. Additionally, by way of example only, long term thresholds monitored by the user load balancing system 12 include: processor load greater than 90% average for more than 180 minutes; disk space utilization greater than 95%; RAM utilization at greater than 90% average for more than 300 minutes; and I/O reads/writes in excess of 85% of capacity for more than 120 minutes, although these are exemplary and again other types and numbers of long term threshold trends can be monitored.

In step 32, the user load balancing system 12 determines if at least one of the thresholds has been exceeded, although other numbers and types of thresholds could be established and checked. If none of the thresholds has been exceeded, then the No branch is taken back to step 30 where the overall load on each of the storage servers 16(1)-16(n) and on each of the application servers 17(1)-17(n) is monitored by the user load balancing system 12. If one or more of the thresholds has been exceeded, then the on or more overall loads which exceeded the threshold are identified and the Yes branch is taken to step 34.

In step 34, the user load balancing system 12 determines which of the one or more user loads in the identified overall load or loads in one or more of the storage servers 16(1)-16(n) and/or application servers 17(1)-17(n) to move to one or more of the other storage servers 16(1)-16(n) and/or application servers 17(1)-17(n) to even out the overall load among all of the available storage servers 16(1)-16(n) and/or application servers 17(1)-17(n), although the user load balancing system 12 can use other manners for identifying which of the user loads to move.

In step 36, the user load balancing system 12 determines an order for moving the user loads identified for transfer in step 34 based on one or more characteristics. By way of example only, these characteristics include identifying which of the user loads: is currently inactive; caused the identified overall load in at least one of the storage server or application server to exceed the threshold; is the largest in the identified overall load; and has the last login date to an application, although other numbers and types of characteristics could be used for determining the order of transfer, such as identifying the services users are using. The particular parameters for determining the order based on these characteristics can be set by the administrator. By way of example only: the user load not currently logged on could be moved first; a single user load which caused the threshold to be exceeded could be moved first; the largest user load could be moved first; or the user load with the oldest login date could be moved first.

Next, in step 38 the user load balancing system 12 determines which of the one or more other storage servers 16(1)-16(n) and/or application servers 17(1)-17(n) to move each of the determined one or more user loads, although the user loads could be moved to other types of servers, such as application servers. By way of example only, the user load balancing system 12 may determine which of the other storage servers 16(1)-16(n) and/or application servers 17(1)-17(n) has the lowest average utilization of at least one of processor space and memory space, although other utilizations could be examined, such as I/O reads, writes, and transactions per second, network, disk space, power, and applications. Additionally by way of example only the user load balancing system 12 may determine which of the one or more other storage servers 16(1)-16(n) and/or application servers 17(1)-17(n) need to receive one or more of the user loads from the identified overall load in the at least one of the storage servers 16(1)-16(n) and/or application servers 17(1)-17(n) to balance the stored load between the storage servers 16(1)-16(n) and/or application servers 17(1)-17(n). As part of this process, the user load balancing system 12 monitors for the addition of any storage server and/or application server that could be considered for transferring some of the user load or user loads. The user load balancing system 12 could actively scan for the addition of new storage servers and/or application servers, although other manners for identifying new storage servers and/or application servers could be used, such as by a notification input by an administrator.

Next, in step 40 the user load balancing system 12 initiates the transfer of the one or more user loads which have been identified and the transfer takes place directly between the storage servers 16(1)-16(n) and/or application servers 17(1)-17(n), although other manners for initiating the transfer and for transferring the user loads could be used.

In step 42, the user load balancing system 12 optionally determines if the transferred one or more user loads match identically with the original one or more user loads, although other types of verifications may be conducted. By way of example only, the user load balancing system 12 performs a checksum, although other methods for assuring an accurate transfer of data can be used or no check may be performed. If the one or more of the user loads have not been correctly copied, then the No branch is taken back to step 40 where the user load balancing system 12 transfers the one or more of the user loads again. If the one or more identified user loads have been correctly transferred, then the Yes branch is taken to step 44.

In step 44, since stateful data, such as email, may continue to flow to the user load being transferred, following the transfer the user load balancing system 12 checks for any incremental updates in the original user loads which may have occurred following the transferring, although other methods for handling incremental updates can be used. For example, when a user load is designated for transfer, the user load could be placed in a queue and only a read only version would be accessible by a user until the transfer of the user load has been completed. Alternatively, during the transfer the system 10 could prevent access to the user load being transferred until the transfer is completed. Returning to step 44, if there are no incremental updates, then the No branch is taken to step 50. If there are incremental updates, then the Yes branch is taken to step 46. In step 46, the user load balancing system 12 transfers the incremental updates into the transferred user loads.

In step 48, the user load balancing system 12 determines if the incremental updates have been correctly transferred, although other types of verifications may be conducted. If the transfer is incorrect, then the No branch is taken back to step 46 where the user load balancing system 12 attempts the transfer of the incremental updates again. Additionally, the user load balancing system 12 may provide a notification that the transfer has failed, although the user load balancing system 12 can provide notification relating to the success or failure of other events or not provide any notification. Further, the user load balancing system 12 can include a history of transactions which have taken place that can be accessed by an administrator, if desired. If the transfer is correct, then the Yes branch is taken to step 50.

In step 50, the user load balancing system 12 updates the directory with the new address or addresses for the user loads. In step 50, the user load balancing system 12 deletes the original user loads in the one or more of the storage servers 16(1)-16(n) and/or application servers 17(1)-17(n) that exceeded the threshold. This frees up resources and should place the overall load in the identified one or more of the storage servers 16(1)-16(n) and/or application servers 17(1)-17(n) below the one or more thresholds. Following step 52, the user load balancing system 12 returns to step 30 for ongoing monitoring of the overall loads in storage servers 16(1)-16(n) and application servers 17(1)-17(n).

Accordingly, the present invention provides an efficient system for balancing user loads comprising stateful data between servers. Additionally, the present invention is able to balance the user loads without requiring any downtime to move user loads between the servers. Further, the present invention is able to ensure the balancing of the user loads without loss of any of the user loads. Even further, as illustrated above the present invention is able to distinguish between temporary heavy usage which would not require intervention and more persistent heavy usage requiring user load balancing through the use of short and long term.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for user load balancing, the method comprising:

identifying with a user load balancing system when an overall load of one or more user data loads in at least one of two or more storage servers exceeds one or more thresholds, wherein the one or more user data loads in at least one of the two or more storage servers comprises stateful data;

determining with the user load balancing system whether the overall load of one or more user data loads exceeds the one or more thresholds temporarily or persistently;

transferring with the user load balancing system one or more of the user data loads in the identified overall load in one of the storage servers to one or more of the other storage servers only when the one or more thresholds is determined to be exceeded persistently based upon the identifying with the user load balancing system, wherein the transferring further comprises placing the one or more user data loads to be transferred in storage which is read only accessible until the transferring one or more user data loads is completed;

identifying with the user load balancing system any changes to the one or more transferred user data loads which occurred during the transferring; and updating with the user load balancing system the one or more transferred user data loads with the identified differences; and updating with the user load balancing system a directory with one or more new locations to the determined one or more other storage servers for each of the one or more transferred user data loads to be configured to respond to a query from an application.

2. The method as set forth in claim 1 wherein the one or more thresholds comprise at least one of processor utilization with respect to one of the overall loads exceeding a first percentage for greater than a first period of time, disk space utilization with respect to one of the overall loads exceeding a second percentage, RAM utilization with respect to one of the overall loads exceeding a third percentage for a greater than a second period of time, and at least one of I/O read/writes and I/O transactions per second with respect to one of the overall loads at greater than a fourth percentage for greater than a third period of time.

3. The method as set forth in claim 1 wherein the one or more thresholds comprise at least one of processor utilization with respect to one of the overall loads exceeding a first percentage average for greater than a first period of time, disk space utilization with respect to one of the overall loads exceeding a second percentage, RAM utilization with respect to one of the overall loads exceeding a third percentage average for a greater than a second period of time, and I/O read/writes with respect to one of the overall loads at greater than a fourth percentage for greater than a third period of time.

4. The method as set forth in claim 1 wherein the transferring further comprises:

determining which of the one or more user data loads in the identified overall load to move to one or more of the other storage servers;

determining which of the one or more other storage servers to move each of the determined one or more user data loads; and moving the determined one or more user data loads in the identified overall load in the at least one of the storage servers to the determined one or more other storage servers.

5. The method as set forth in claim 4 wherein the moving the determined one or more user data loads further comprises:

transferring the one or more determined user data loads to the determined one or more other storage servers; and obtaining a verification that each of the one or more transferred user data loads is identical to the corresponding one of the determined one or more user data loads.

6. The method as set forth in claim 4 wherein the determining which of the one or more user data loads in the identified overall load in the at least one of the storage servers to move to one or more of the other storage servers further comprises:

determining an order for moving the determined one or more user data loads based on one or more characteristics; and moving the determined one or more user data loads in accordance with the determined order.

7. The method as set forth in claim 6 wherein the one or more characteristics comprise at least one of the user data loads which is currently inactive, which caused the identified overall load in the at least one of the storage servers to exceed the one or more thresholds, which is the largest in the identified overall load in the at least one storage server, and which has a last login date to an application.

8. The method as set forth in claim 4 wherein the determining which of the one or more other storage servers to move each of the determined one or more user data loads further comprises determining which of the other storage servers has a lowest average utilization of at least one of processor space and memory space and moving the determined one or more user data loads to the determined storage server with the lowest average utilization of at least one of processor space and memory space.

9. The method as set forth in claim 4 wherein the determining which of the one or more other storage servers to move each of the determined one or more user data loads further comprises determining which of the one or more other storage servers need to receive one or more of the user data loads from the identified overall load in the at least one of the storage servers to balance the stored load between the storage servers and moving the determined one or more user data loads to the determined one or more other storage servers to balance the stored load.

10. The method as set forth in claim 4 wherein the determining which of the one or more other storage servers to move each of the determined one or more user data loads further comprises identifying when another storage server has been added to the one or more other storage servers before the determining which of the one or more other storage servers to move each of the determined one or more user data loads.

11. The method as set forth in claim 1 wherein the transferring further comprises deleting the transferred one or more of the user data loads in the identified overall load in the at least one of the storage servers after the transferring.

12. A non-transitory computer readable medium having stored thereon instructions for user load balancing comprising machine executable code which when executed by at least one processor, causes the processor to perform steps comprising:

identifying when an overall load of one or more user data loads in at least one of two or more storage servers exceeds one or more thresholds, wherein the one or more user data loads in at least one of the two or more storage servers comprises stateful data;

determining whether the overall load of one or more user data loads exceeds the one or more thresholds temporarily or persistently;

transferring one or more of the user data loads in the identified overall load in one of the storage servers to one or more of the other storage servers only when the one or more thresholds is determined to be exceeded persistently based upon the identifying, wherein the transferring further comprises placing the one or more user data loads to be transferred in storage which is read only accessible until the transferring one or more user data loads is completed;

identifying any changes to the one or more transferred user data loads which occurred during the transferring; and updating the one or more transferred user data loads with the identified differences; and updating a directory with one or more new locations to the determined one or more other storage servers for each of the one or more transferred user data loads to be configured to respond to a query from an application.

13. The medium as set forth in claim 12 wherein the one or more thresholds comprise at least one of processor utilization with respect to one of the overall loads exceeding a first percentage for greater than a first period of time, disk space utilization with respect to one of the overall loads exceeding a second percentage, RAM utilization with respect to one of the overall loads exceeding a third percentage for a greater than a second period of time, and at least one of I/O read/writes and I/O transactions per second with respect to one of the overall loads at greater than a fourth percentage for greater than a third period of time.

14. The medium as set forth in claim 12 wherein the one or more thresholds comprise at least one of processor utilization with respect to one of the overall loads exceeding a first percentage average for greater than a first period of time, disk space utilization with respect to one of the overall loads exceeding a second percentage, RAM utilization with respect to one of the overall loads exceeding a third percentage average for a greater than a second period of time, and I/O read/writes with respect to one of the overall loads at greater than a fourth percentage for greater than a third period of time.

15. The medium as set forth in claim 12 wherein the transferring further comprises:

determining which of the one or more user data loads in the identified overall load to move to one or more of the other storage servers;

determining which of the one or more other storage servers to move each of the determined one or more user data loads; and moving the determined one or more user data loads in the identified overall load in the at least one of the storage servers to the determined one or more other storage servers.

16. The medium as set forth in claim 15 wherein the moving the determined one or more user data loads further comprises:

transferring the one or more determined user data loads to the determined one or more other storage servers; and obtaining a verification that each of the one or more transferred user data loads is identical to the corresponding one of the determined one or more user data loads.

17. The medium as set forth in claim 15 wherein the determining which of the one or more user data loads in the identified overall load in the at least one of the storage servers to move to one or more of the other storage servers further comprises:

determining an order for moving the determined one or more user data loads based on one or more characteristics; and moving the determined one or more user data loads in accordance with the determined order.

18. The medium as set forth in claim 17 wherein the one or more characteristics comprise at least one of the user data loads which is currently inactive, which caused the identified overall load in the at least one of the storage servers to exceed the one or more thresholds, which is the largest in the identified overall load in the at least one storage server, and which has a last login date to an application.

19. The medium as set forth in claim 15 wherein the determining which of the one or more other storage servers to move each of the determined one or more user data loads further comprises determining which of the other storage servers has a lowest average utilization of at least one of processor space and memory space and moving the determined one or more user data loads to the determined storage server with the lowest average utilization of at least one of processor space and memory space.

20. The medium as set forth in claim 15 wherein the determining which of the one or more other storage servers to move each of the determined one or more user data loads further comprises determining which of the one or more other storage servers need to receive one or more of the user data loads from the identified overall load in the at least one of the storage servers to balance the stored load between the storage servers and moving the determined one or more user data loads to the determined one or more other storage servers to balance the stored load.

21. The medium as set forth in claim 15 wherein the determining which of the one or more other storage servers to move each of the determined one or more user data loads further comprises identifying when another storage server has been added to the one or more other storage servers before the determining which of the one or more other storage servers to move each of the determined one or more user data loads.

22. The medium as set forth in claim 12 wherein the transferring further comprises deleting the transferred one or more of the user data loads in the identified overall load in the at least one of the storage servers after the transferring.

23. A user load balancing apparatus comprising:

one or more processors;

a memory coupled to the one or more processors, the one or more processors configured to execute programmed instructions stored in the memory comprising:

identifying when an overall load of one or more user data loads in at least one of two or more storage servers exceeds one or more thresholds, wherein the one or more user data loads in at least one of the two or more storage servers comprises stateful data;

determining whether the overall load of one or more user data loads exceeds the one or more thresholds temporarily or persistently;

transferring one or more of the user data loads in the identified overall load in one of the storage servers to one or more of the other storage servers only when the one or more thresholds is determined to be exceeded persistently based upon the identifying, wherein the transferring further comprises placing the one or more user data loads to be transferred in storage which is read only accessible until the transferring one or more user data loads is completed;

identifying any changes to the one or more transferred user data loads which occurred during the transferring; and updating the one or more transferred user data loads with the identified differences; and updating a directory with one or more new locations to the determined one or more other storage servers for each of the one or more transferred user data loads to be configured to respond to a query from an application.

24. The apparatus as set forth in claim 23 wherein the one or more thresholds comprise at least one of processor utilization with respect to one of the overall loads exceeding a first percentage for greater than a first period of time, disk space utilization with respect to one of the overall loads exceeding a second percentage, RAM utilization with respect to one of the overall loads exceeding a third percentage for a greater than a second period of time, and at least one of I/O read/writes and I/O transactions per second with respect to one of the overall loads at greater than a fourth percentage for greater than a third period of time.

25. The apparatus as set forth in claim 23 wherein the one or more thresholds comprise at least one of processor utilization with respect to one of the overall loads exceeding a first percentage average for greater than a first period of time, disk space utilization with respect to one of the overall loads exceeding a second percentage, RAM utilization with respect to one of the overall loads exceeding a third percentage average for a greater than a second period of time, and I/O read/writes with respect to one of the overall loads at greater than a fourth percentage for greater than a third period of time.

26. The apparatus as set forth in claim 23 wherein the transferring further comprises:
   determining which of the one or more user data loads in the identified overall load to move to one or more of the other storage servers;
   determining which of the one or more other storage servers to move each of the determined one or more user data loads; and
   moving the determined one or more user data loads in the identified overall load in the at least one of the storage servers to the determined one or more other storage servers.

27. The apparatus as set forth in claim 26 wherein the moving the determined one or more user data loads further comprises:
   transferring the one or more determined user data loads to the determined one or more other storage servers; and
   obtaining a verification that each of the one or more transferred user data loads is identical to the corresponding one of the determined one or more user data loads.

28. The apparatus as set forth in claim 26 wherein the determining which of the one or more user data loads in the identified overall load in the at least one of the storage servers to move to one or more of the other storage servers further comprises:
   determining an order for moving the determined one or more user data loads based on one or more characteristics; and
   moving the determined one or more user data loads in accordance with the determined order.

29. The apparatus as set forth in claim 28 wherein the one or more characteristics comprise at least one of the user data loads which is currently inactive, which caused the identified overall load in the at least one of the storage servers to exceed the one or more thresholds, which is the largest in the identified overall load in the at least one storage server, and which has a last login date to an application.

30. The apparatus as set forth in claim 26 wherein the determining which of the one or more other storage servers to move each of the determined one or more user data loads further comprises determining which of the other storage servers has a lowest average utilization of at least one of processor space and memory space and moving the determined one or more user data loads to the determined storage server with the lowest average utilization of at least one of processor space and memory space.

31. The apparatus as set forth in claim 26 wherein the determining which of the one or more other storage servers to move each of the determined one or more user data loads further comprises determining which of the one or more other storage servers need to receive one or more of the user data loads from the identified overall load in the at least one of the storage servers to balance the stored load between the storage servers and moving the determined one or more user data loads to the determined one or more other storage servers to balance the stored load.

32. The apparatus as set forth in claim 26 wherein the determining which of the one or more other storage servers to move each of the determined one or more user data loads further comprises identifying when another storage server has been added to the one or more other storage servers before the determining which of the one or more other storage servers to move each of the determined one or more user data loads.

33. The apparatus as set forth in claim 23 wherein the transferring further comprises deleting the transferred one or more of the user data loads in the identified overall load in the at least one of the storage servers after the transferring.

* * * * *